(12) United States Patent
Kaippallimalil et al.

(10) Patent No.: US 8,706,880 B2
(45) Date of Patent: Apr. 22, 2014

(54) MANAGE A SHARED COMPUTING RESOURCE BASED ON RESOURCE USE REPORTS

(75) Inventors: Mathew M. Kaippallimalil, Plano, TX (US); David C. Williamson, McKinney, TX (US); Anh Q. Tran, Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 227 days.

(21) Appl. No.: 13/034,531

(22) Filed: Feb. 24, 2011

(65) Prior Publication Data

US 2012/0221727 A1 Aug. 30, 2012

(51) Int. Cl.
*G06F 15/16* (2006.01)

(52) U.S. Cl.
USPC ............ 709/226; 709/206; 709/217; 370/328

(58) Field of Classification Search
USPC ............................ 709/226, 206, 217; 370/328
See application file for complete search history.

(56) References Cited

U.S. PATENT DOCUMENTS

| | | | |
|---|---|---|---|
| 7,023,979 B1 * | 4/2006 | Wu et al. ................... | 379/265.11 |
| 7,689,512 B2 | 3/2010 | Hase et al. | |
| 8,098,622 B2 * | 1/2012 | Yeo et al. ...................... | 370/329 |
| 8,260,840 B1 * | 9/2012 | Sirota et al. ................... | 709/201 |
| 2002/0041606 A1 * | 4/2002 | Chin et al. ..................... | 370/468 |
| 2003/0033601 A1 * | 2/2003 | Sakata et al. ..................... | 725/29 |
| 2005/0128972 A1 * | 6/2005 | Kim et al. ...................... | 370/328 |
| 2007/0270139 A1 * | 11/2007 | Jendbro et al. ............. | 455/422.1 |
| 2007/0299845 A1 | 12/2007 | Tokunaga | |
| 2008/0235141 A1 | 9/2008 | Hilerio et al. | |
| 2008/0243699 A1 | 10/2008 | Hilerio et al. | |
| 2010/0064043 A1 * | 3/2010 | Iino et al. ...................... | 709/226 |
| 2011/0078583 A1 * | 3/2011 | Chunilal ........................ | 715/747 |
| 2011/0195721 A1 * | 8/2011 | Harindranath ............. | 455/456.1 |
| 2011/0225300 A1 * | 9/2011 | Kaneki ........................... | 709/226 |
| 2012/0131180 A1 * | 5/2012 | Nomura et al. ............... | 709/224 |

FOREIGN PATENT DOCUMENTS

JP 2001236219 A 8/2001

* cited by examiner

*Primary Examiner* — Quang N Nguyen
*Assistant Examiner* — Tesfay Yohannes

(57) ABSTRACT

Embodiments disclosed herein relate to managing a shared computing resource based on resource use reports. In one embodiment, a manager electronic device manages a shared computing resource based on resource use reports from agent electronic devices. The manager electronic device may send resource use instructions to the agent electronic devices, and the agent electronic devices may use the resource based on the instructions.

13 Claims, 9 Drawing Sheets

MANAGE A SHARED COMPUTING RESOURCE BASED ON RESOURCE USE REPORTS

BACKGROUND

Computing resources may be shared among multiple electronic devices. For example, a distributed computing system may have a number of software licenses for the computing system as a whole that may be allocated among the different electronic devices forming nodes in the distributed computing system. Managing a shared resource may be done, for example, by a central electronic device. Other electronic devices in the computing system may send a message to a central electronic device to request a resource, and the central electronic device may return a message as to whether the resource request may be granted.

BRIEF DESCRIPTION OF THE DRAWINGS

In the accompanying drawings, like numerals refer to like components or blocks. The drawings describe example embodiments. The drawings show methods performed in an example order, but the methods may also be performed in other orders. The following detailed description references the drawings, wherein.

DETAILED DESCRIPTION

Figure 1:
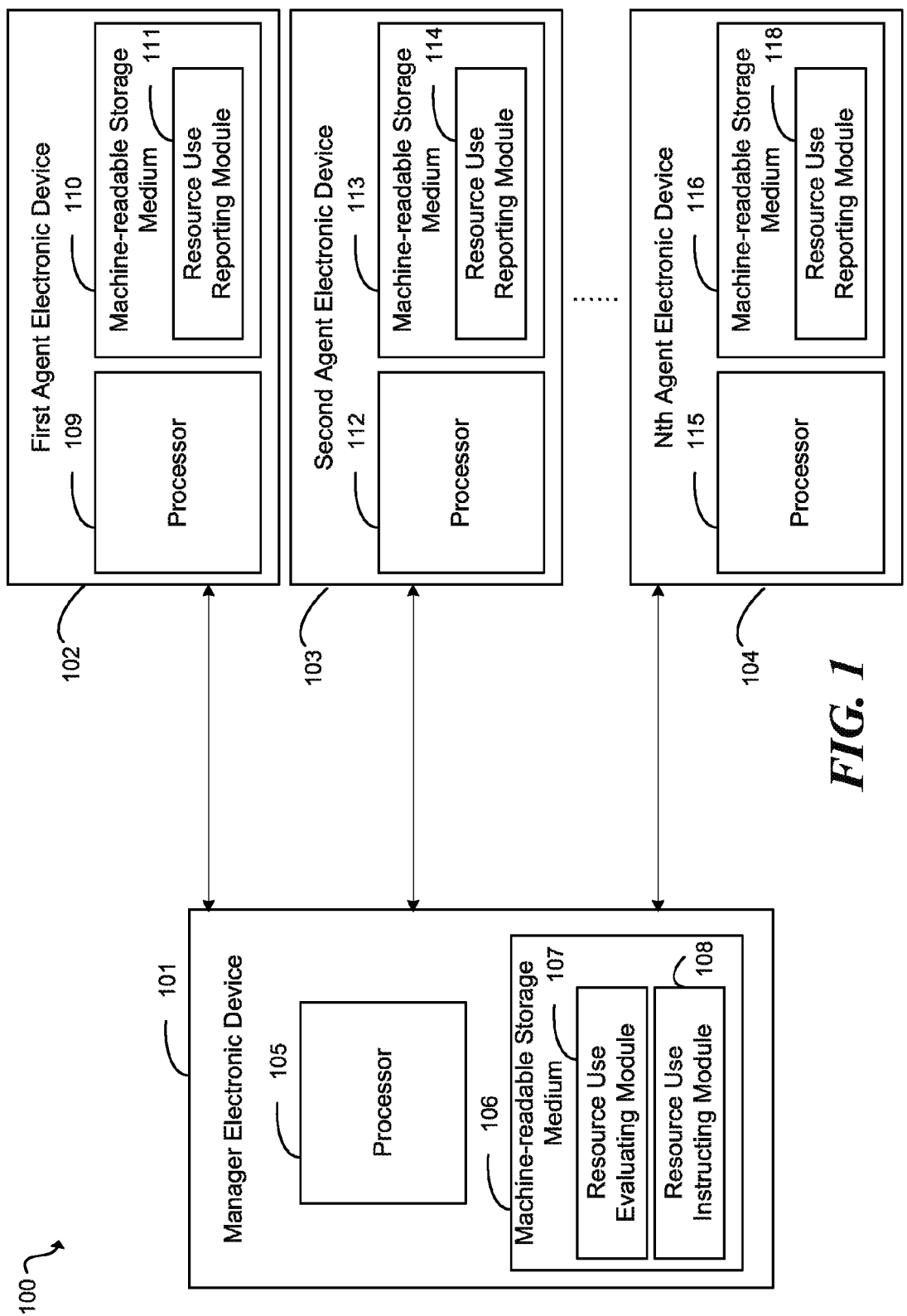
FIG. 1 is a block diagram illustrating one example of a computing system.

In one embodiment, a computing system for managing a resource shared among multiple electronic devices includes a manager electronic device for managing the use of the resource system wide and for instructing individual agent electronic devices within the computing system about their allowed local resource use. The agent electronic devices may track the use of the resource on the individual agent electronic devices, allocate the resource on the agent electronic device according to the instructions from the manager electronic device, and report information about the use of the resource on the agent electronic device to the manager electronic device. For example, the agent electronic devices may each periodically inform the manager electronic device the amount of the resource currently in use on the individual agent electronic device.

The manager electronic device may determine the remaining amount of the resource based on the reports about resource use from the agent electronic devices and periodically instruct the agent electronic devices about the use of the resource, such as whether the agent electronic devices may continue to allocate more of the resource or temporarily stop allocating more of the resource. For example, the manager electronic device may determine that there is no remaining availability of the resource and may instruct the agent electronic devices not to allocate additional amounts of the resource. The manager electronic device may continue to analyze reports from the agent electronic devices and provide instructions to continue allocating the resource once the manager electronic device determines the amount of the resource in use is below a threshold. Periodically sending instructions to agent electronic devices may provide more flexibility than strictly allocating the amount of a resource that may be used by each agent electronic device.

Such a system may use fewer overall messages than a system where a message is sent each time a resource is requested or each time a requested resource is granted or denied, particularly where there is a high volume of resource use and the resource is used and released quickly. A system involving agent electronic devices messaging information about their resource use to the management electronic device may have configuration advantages. For example, if a new agent electronic device is added to the system, the management electronic device may receive a message from the new agent electronic device indicating its resource use, and the management electronic device may then begin to send resource use instructions to the new agent electronic device. The management electronic device may track the amount of resource use without being aware of the number of agent electronic devices and may adapt if messages are received from more or fewer agent electronic devices.

A loss of communication between a management electronic device and an agent electronic device may be more efficiently resolved using an interval messaging system. For example, if an agent electronic device loses communication with the management electronic device, the agent electronic device may refuse additional resource requests until contact is established with the management electronic device again. During that time, resources in use may be released as the agent electronic device is finished with the resource. The management electronic device may assume that agent electronic devices that do not send it a message about their resource use are not granting requests to use the resource.

FIG. 1 is a block diagram illustrating one example of a computing system 100. The computing system 100 includes, for example, a manager electronic device 101 and a first agent electronic device 102 and a second agent electronic device 103 to an Nth agent electronic device 104. The computing system 100 may include any number of agent electronic devices. In one embodiment, the computing system 100 is a distributed computing system where the multiple agent electronic devices 102, 103, and 104 work together. The multiple agent computers may function separately, such as where each agent electronic device may be associated with a different user.

The manager electronic device 101 may be any suitable electronic device, such as a personal computer or server. The manager electronic device 101 may include a processor 105 and a machine-readable storage medium 106. The processor 105 may be any suitable processor, such as a central processing unit (CPU), a semiconductor-based microprocessor, or any other device suitable for retrieval and execution of instructions. In one embodiment, the manager electronic device 101 includes logic instead of or in addition to the processor 105. As an alternative or in addition to fetching, decoding, and executing instructions, the processor 105 may include one or more integrated circuits (ICs) or other electronic circuits that comprise a plurality of electronic components for performing the functionality described below. In one implementation, the manager electronic device 101 includes multiple processors. For example, one processor may perform some functionality and another processor may perform other functionality.

The machine-readable storage medium 106 may be any suitable machine readable medium, such as an electronic, magnetic, optical, or other physical storage device that stores executable instructions or other data (e.g., a hard disk drive, random access memory, flash memory, etc.). The machine-readable storage medium 106 may be, for example, a computer readable non-transitory medium. The machine-readable storage medium 106 may include instructions executable by the processor 105.

The machine-readable storage medium 106 may include a resource use evaluating module 107 and a resource use instructing module 108. The resource use evaluating module 107 may include instructions executable by the processor to determine the available amount of the resource based on information from the multiple agent electronic devices 102, 103, and 104 about their current resource use. The resource use instructing module 108 may be executed to instruct the agent electronic devices 102, 103, and 104 about resource use on the individual electronic devices 102, 103, and 104. For example, the manager electronic device 101 may instruct the agent electronic devices 102, 103, and 104 to stop allocating additional resources. The manager electronic device 101 may communicate the instructions in any suitable manner, such as via a network.

The agent electronic devices 102, 103, and 104 may be any suitable electronic devices, such as personal computers, servers, or mobile computing devices. The agent electronic devices 104, 106, and 108 may communicate with the manager electronic device 102, such as via a network. In one implementation, the agent electronic devices 102, 103, and 104 in some cases do not communicate with one another.

The agent electronic devices 102, 103, and 104 may each include a processor 109, 112, and 115 respectively. The processors 109, 112, and 115 may be any suitable processors, such as a central processing unit (CPU), a semiconductor-based microprocessor, or any other device suitable for retrieval and execution of instructions. In one embodiment, the agent electronic devices 102, 103, and 104 include logic instead of or in addition to the processors 109, 112, and 115.

The agent electronic devices 102, 103, and 104 may each include a machine-readable storage medium 110, 113, and 116 respectively. The machine-readable storage mediums 110, 113, and 116 may be any suitable machine readable mediums, such as electronic, magnetic, optical, or other physical storage devices that store executable instructions or other data (e.g., a hard disk drive, random access memory, flash memory, etc.). The machine-readable storage mediums 110, 113, and 116 may be, for example, computer readable non-transitory mediums. The machine-readable storage mediums 110, 113, and 116 may include instructions executable by the processors 109, 112, and 115, respectively.

The machine-readable storage mediums 110, 113, and 116 may each include a resource use reporting module, such as the resource use reporting modules 111, 114, and 118. The resource use reporting modules 111, 114, and 118 may include instructions for reporting the amount of resource use on each of the individual agent electronic devices. For example, the reporting use module 111 may include instructions for reporting the amount of a resource currently in use on the first agent electronic device 102. The amount of a resource currently in use on an agent electronic device may change over time. For example, a resource may be allocated and then later released.

Figure 2:
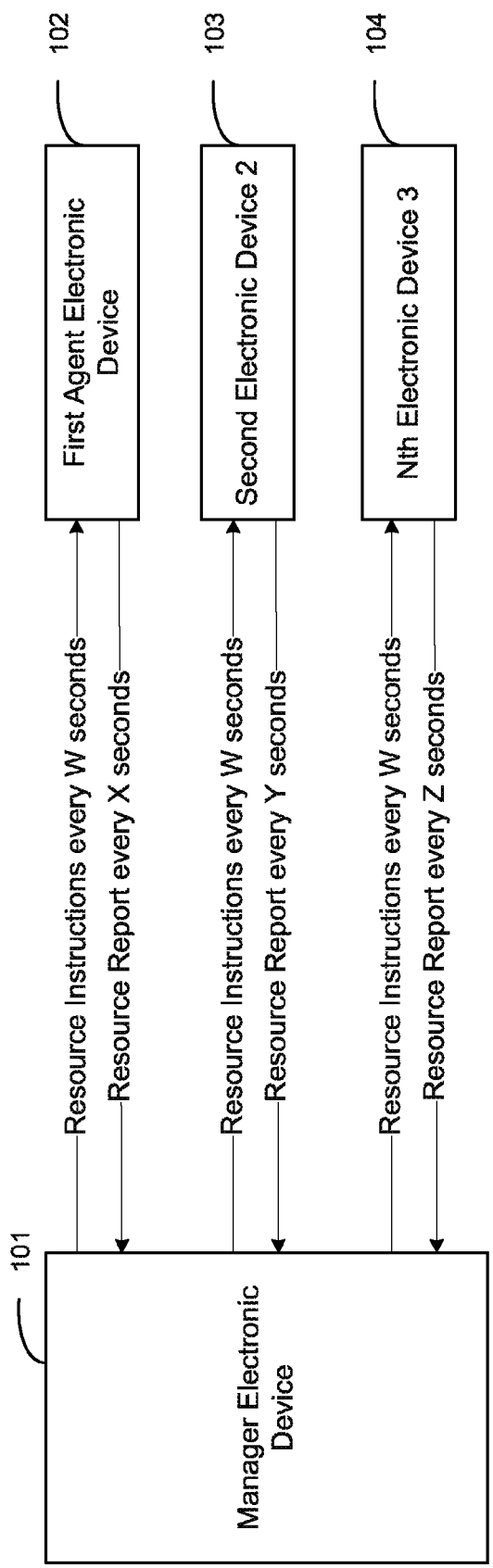
FIG. 2 is a block diagram illustrating one example of communicating resource use information between a manager electronic device and multiple agent electronic devices.

FIG. 2 is a block diagram illustrating one example of communicating resource use information between the manager electronic device 101 and multiple agent electronic devices 102, 103, and 104. FIG. 2 includes the manager electronic device 101 and the agent electronic devices 102, 103, and 104. The messages may be sent between the manager electronic device 101 and the agent electronic devices 102, 103, and 104 periodically rather than each time a resource is requested or granted. The manager electronic device 101 may periodically send a message, such as every W seconds, to the agent electronic devices 102, 103, and 104 providing instructions about the use of a resource on the agent electronic devices 102, 103, and 104. The agent electronic devices 102, 103, and 104 may periodically send messages to the manager electronic device 101, such as at the same or at different intervals, providing information about the use of the resource on the individual electronic device. In some cases, the interval at which the manager electronic device 101 sends instructions to the agent electronic devices 102, 103 and 104 may be greater than the interval at which the manager electronic device 101 receives reports from the agent electronic devices 102, 103, and 104. For example, the interval for sending instructions may be twice the size of the reporting interval.

Figure 3:
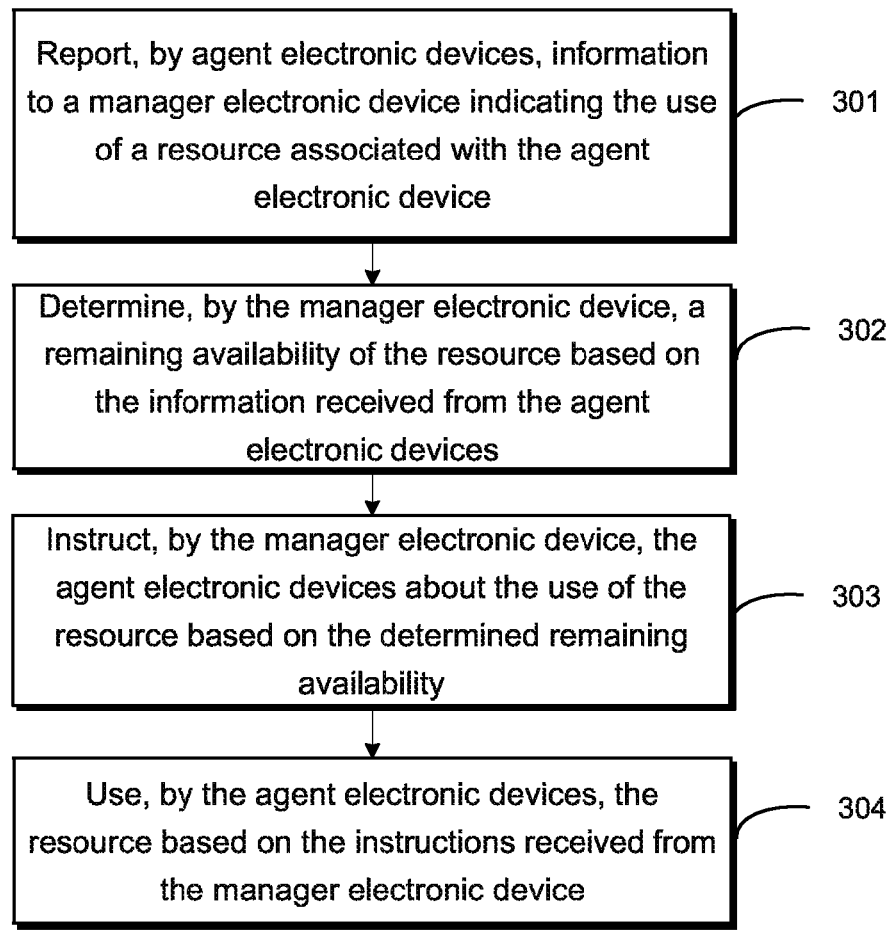
FIG. 3 is a flow chart illustrating one example of a method for managing a shared computing resource based on resource use reports.

FIG. 3 is a flow chart illustrating one example of a method 300 for managing a shared computing resource based on resource use reports. Multiple agent electronic devices may locally track the use of a resource and report information about the use of the resource to a management electronic device. For example, each agent electronic device may report information about the amount of a resource in use on the particular agent electronic device. The management electronic device may collect the information about resource use from the agent electronic devices and determine the status of the resource, such as whether the amount of resource use is above a threshold. The management electronic device may send messages to each of the agent electronic devices to communicate instructions about the use of the resource locally on the particular agent electronic device based on the determined status of the resource. For example, if too much of a resource has been allocated, the management electronic device may send a message that the agent electronic devices should temporarily deny a request to allocate more of the resource. The method 300 may be executed, for example, on the computing system 100.

Beginning at 301, multiple agent electronic devices in a computing system each report information to a manager electronic device indicating the use of a resource associated with the agent electronic devices. The manager electronic device may be, for example, the manager electronic device 101. The agent electronic devices may be any suitable electronic devices consuming the resource. For example, the agent electronic devices may be the agent electronic devices 102, 103, and 104 from FIG. 1 executing the resource use reporting instructions 111, 114, and 118. There may be any number of agent electronic devices, and in some cases, the number of agent electronic devices may change over time. For example, initially three agent electronic devices may be using the resource, and at a later point ten agent electronic devices may be using the resource. The agent electronic devices may report to the manager electronic device in any suitable method for communicating between two electronic devices. For example, the agent electronic device may communicate the information via a network, such as a local area network (LAN) or the Internet.

The resource may be any suitable computing resource shared among the agent electronic devices. For example, the resource may be a software license, shared memory, or a shared processor. In some cases, the resource use may be limited. For example, there may be a limited amount of available software licenses, a limited amount of software licenses that may be in use at a given time, or a limited capacity, such as a set amount of shared memory.

The agent electronic devices may track the local use of the resource. For example, the agent electronic device may receive requests for a resource, such as from a software program executing on the agent electronic device, and grant or deny the requests. The agent electronic devices may determine the number of resources allocated and the number released.

The agent electronic devices may provide any suitable information about their resource use. In some cases, the agent electronic devices may receive instructions from the manager electronic device as to the type of information to provide to the manager electronic device. The agent electronic devices may provide the manager the same type of information or different types of resource information than one another.

Figure 4:
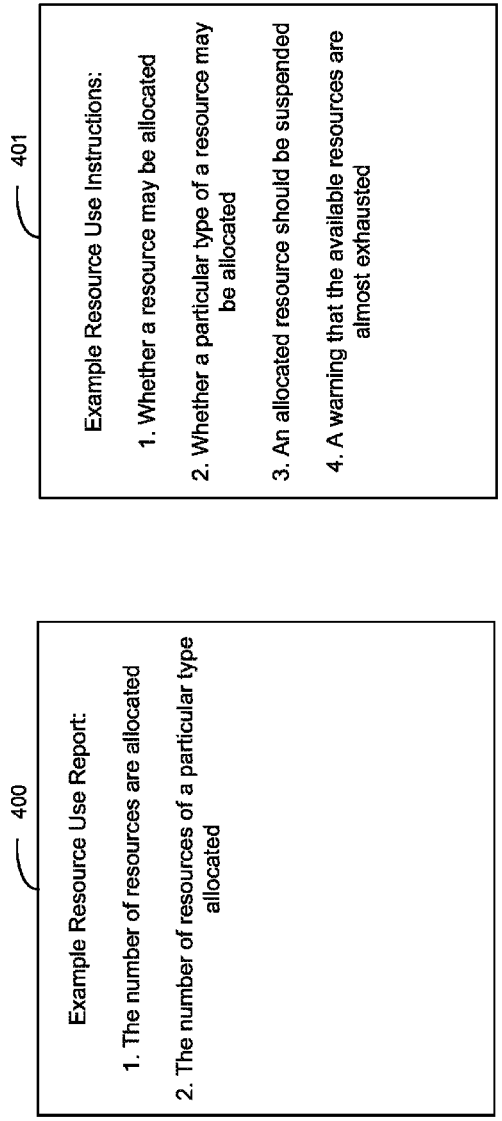
FIG. 4 is a diagram illustrating one example of a resource use report associated with an agent electronic device and a resource use instruction associated with a manager electronic device.

FIG. 4 is a diagram illustrating one example of a resource use report 401 associated with an agent electronic device and a resource use instruction 402 associated with a manager electronic device. Example resource use report 401 illustrates examples of the type of information that may be reported by agent electronic devices. The resource information may be, for example, the amount of a resource currently in use or the type of each resource currently in use. For example, an agent electronic device may grant local requests for the use of ten licenses, but in a small amount of time four of the licenses may no longer be used. The agent electronic device may report to the manager electronic device that ten licenses are in use then a subsequent message may indicate that six licenses are in use.

In one implementation, the manager electronic device determines the presence or absence of agent electronic devices based on the resource reports. For example, the manager electronic device may not track the configuration of the computing system. The agent electronic devices may provide a resource use report at an interval, and the management electronic device may assume that an agent electronic device left the computing system or is no longer using the resource if a resource use report is not received at the expected interval. A new agent electronic device may send the manager electronic device a message that is added to the system or beginning to use the resource, or the new agent electronic device may begin sending resource use reports to the manager electronic device without a separate message.

Referring back to FIG. 3 and moving to 302, the manager electronic device determines a remaining availability of the resource based on the information received from the agent electronic devices. The manager electronic device may determine the remaining availability of the resource in any suitable manner. For example, the manager electronic device may receive information from each of the agent electronic devices about the amount of a resource in use in the particular agent electronic device. The manager electronic device may aggregate the information, such as by summing the number of resources in use in multiple agent electronic devices. The manager electronic device may compare the number of resources in use to a threshold indicating a number of a resource that may be used or a number that may be used in a given time period. The manager electronic device may determine that an agent electronic device is not using the resource if no report is received from the agent electronic device during the expected interval.

Continuing to 303, the manager electronic device instructs the agent electronic devices about the use of the resource based on the determined remaining availability. The manager electronic device may use any suitable method of communication to instruct the agent electronic devices. For example, the manager electronic device may send instructions via a network. The instructions may be the same for each agent electronic device or may be tailored to each individual agent electronic device. The manager electronic device may, for example, send instructions in response to a resource use report from an agent electronic device or at a set interval. In some cases, the manager electronic device may inform the agent electronic devices the interval at which the manager electronic device will send instructions, and the manager electronic device may change the length of the interval.

FIG. 4 shows examples of communications between the manager electronic device and agent electronic devices. Example resource instructions 401 show example instructions that a manager electronic device may provide to agent electronic devices. For example, the instructions may indicate whether an agent electronic device may continue to allocate additional amounts of the resource or the types of the resource that an agent electronic device may continue to allocate, such as where an agent electronic device may allocate more of type A software licenses but may not allocate more of type B software licenses. If the manager electronic device determines that the amount of current resource use is above a threshold, the manager electronic device may instruct the agent electronic devices not to allocate additional resources so that the amount of the resource in use decreases as resources in use are released, or the manager electronic device may instruct the agent electronic devices to suspend resources already in use. The manager electronic device may send instructions related to the status of the resource, such as a warning that the amount of available resources is low indicating that an instruction to stop allocating resources may be issued soon.

In some cases, the manager electronic device may send instructions about an agent's resource reports to the manager. The manager electronic device may send an instruction for the agent electronic device to report information about its resource use more or less often. For example, it may be desirable to have a more frequent report if the remaining availability of the resource is low so that the manager electronic device may be able to respond quickly to an over allocation of resources. As another example, it may be desirable to have a more frequent report where the agent electronic devices were instructed not to allocate resources so that allocation may begin again more quickly.

Referring back to FIG. 3 and proceeding (to 304, the agent electronic devices use the resource based on the instructions received from the manager electronic device. For example, the agent electronic devices may grant or deny resource requests on the individual agent electronic device based on the instructions received from the manager electronic device.

In one implementation, if communication with the management electronic device is lost, such as where the agent electronic device fails to receive a resource use instruction during the expected time period, the agent electronic device stops allocating additional resources until communication resumes. The agent electronic device may continue to allocate resources if, for example, an instruction is received again from the management electronic device. In some cases, the agent electronic device may continue to attempt to communicate with the manager electronic device.

FIGS. 5A-5E are diagrams illustrating examples of communications between a manager electronic device and agent electronic devices A, B, and C. Each electronic device is shown with a timeline of its actions beneath it. The manager electronic device determines the remaining availability of a license resource and instructs the agent electronic devices A, B, and C on their use of licenses. Agent electronic devices A, B, and C may locally allocate licenses and report information about their use of licenses to the manager electronic device.

Figure 5A:
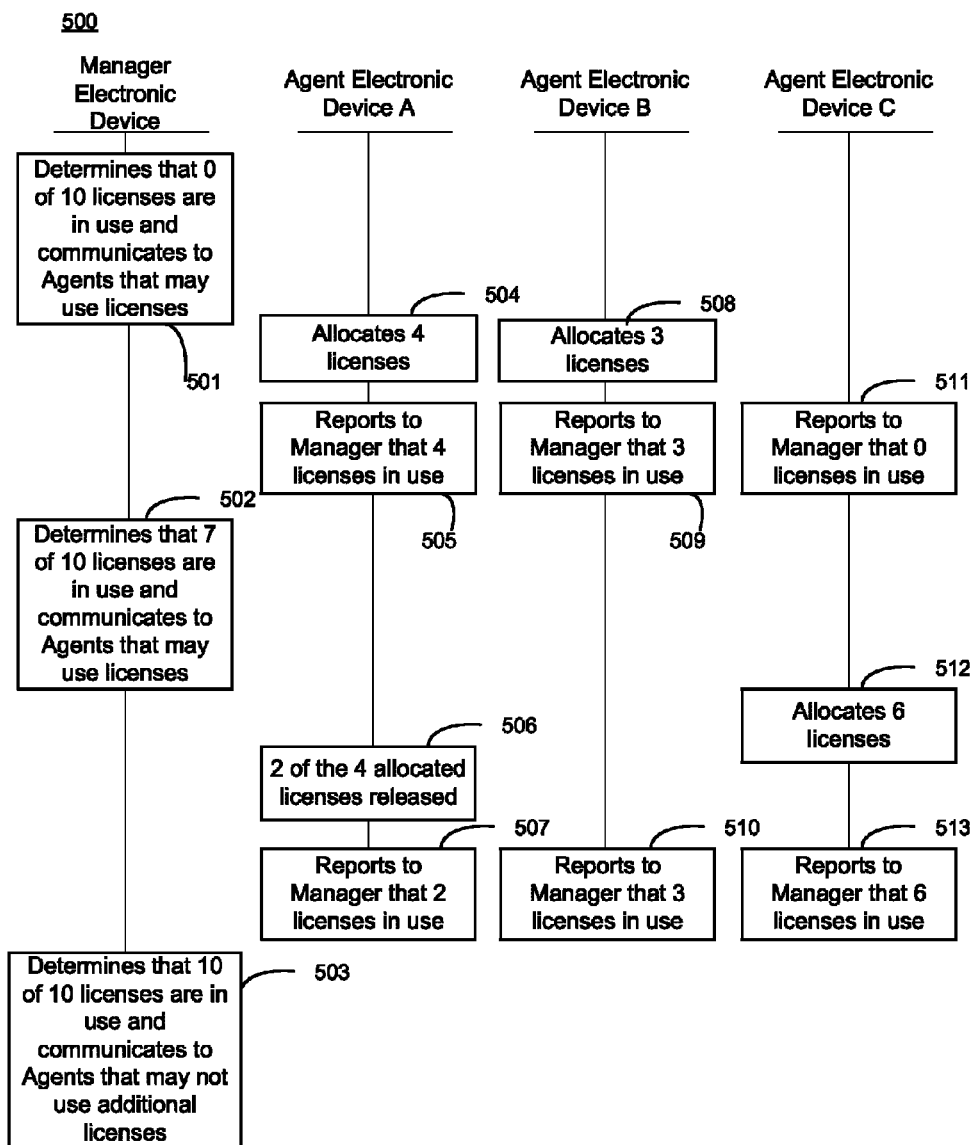
FIG. 5A is a diagram illustrating one example of a timeline of resource use communications between a manager electronic devices and agent electronic devices.

FIG. 5A is a diagram illustrating one example 500 of a timeline of resource use communications between a manager electronic devices and agent electronic devices A, B, and C. At 501, the manager electronic device determines that zero of ten available licenses are in use. Because the threshold of ten licenses is not met, the manager electronic device sends instructions to the agent electronic devices A, B, and C that the agent electronic devices may use additional licenses. At 504, the agent electronic device A allocates four licenses for the agent electronic device A. The licenses may be allocated, for example, in response to a request. The requests and allocation for each license may occur simultaneously or at different times. At 508, the agent electronic device B allocates three licenses on the agent electronic device B. The agent electronic device B may allocate licenses separately from the agent electronic device A, such as at a different time or using a different method. Agent electronic device C does not allocate licenses in response to the manager electronic device instruction. For example, during the time period, the agent electronic device C may not be using processes or software related to the license.

The agent electronic devices A, B, and C may periodically report information about their resource use to the manager electronic device. For example, at 505, the agent electronic device A reports to the manager electronic device that four licenses are in use, at 509, the agent electronic device B reports to the manager electronic device that three licenses are in use, and at 511, the agent electronic device C reports that zero licenses are in use.

The manager electronic device may use the information received from the agent electronic devices to determine the remaining availability of the resource. For example, at 502, the manager electronic device determines that seven of ten available licenses are in use because four are in use by the agent electronic device A and three are in use by the agent electronic device B. Because there are three remaining licenses, the manager electronic device may send instructions to the agent electronic devices that additional licenses may be used.

In response to the instructions, the agent electronic devices A, B, and C may continue to allocate additional licenses. For example, at 512, the agent electronic device C allocates six licenses. The number of outstanding licenses may remain lower despite additional licenses being allocated because licenses may be released when a process, hardware, or software related to the license is no longer in use. For example, at 506, two of the four allocated licenses on the agent electronic device A are released. As a result of the releasing process, a report of resource use to the manager electronic device may include fewer licenses than were in use during a previous report.

The agent electronic devices A, B, and C may continue to periodically provide a status report to the manager electronic device indicating information about outstanding licenses. For example, at 507, the agent electronic device A reports that two licenses are in use, at 510, the agent electronic device B reports that three licenses are in use, and at 513, the agent electronic device C reports that six licenses are in use. At 503, the manager electronic device analyzes the reports to determine that ten of ten available licenses are in use. Because the threshold is met, the manager electronic device sends an instruction to each of the agent electronic devices not to allocate additional resources.

Figure 5B:
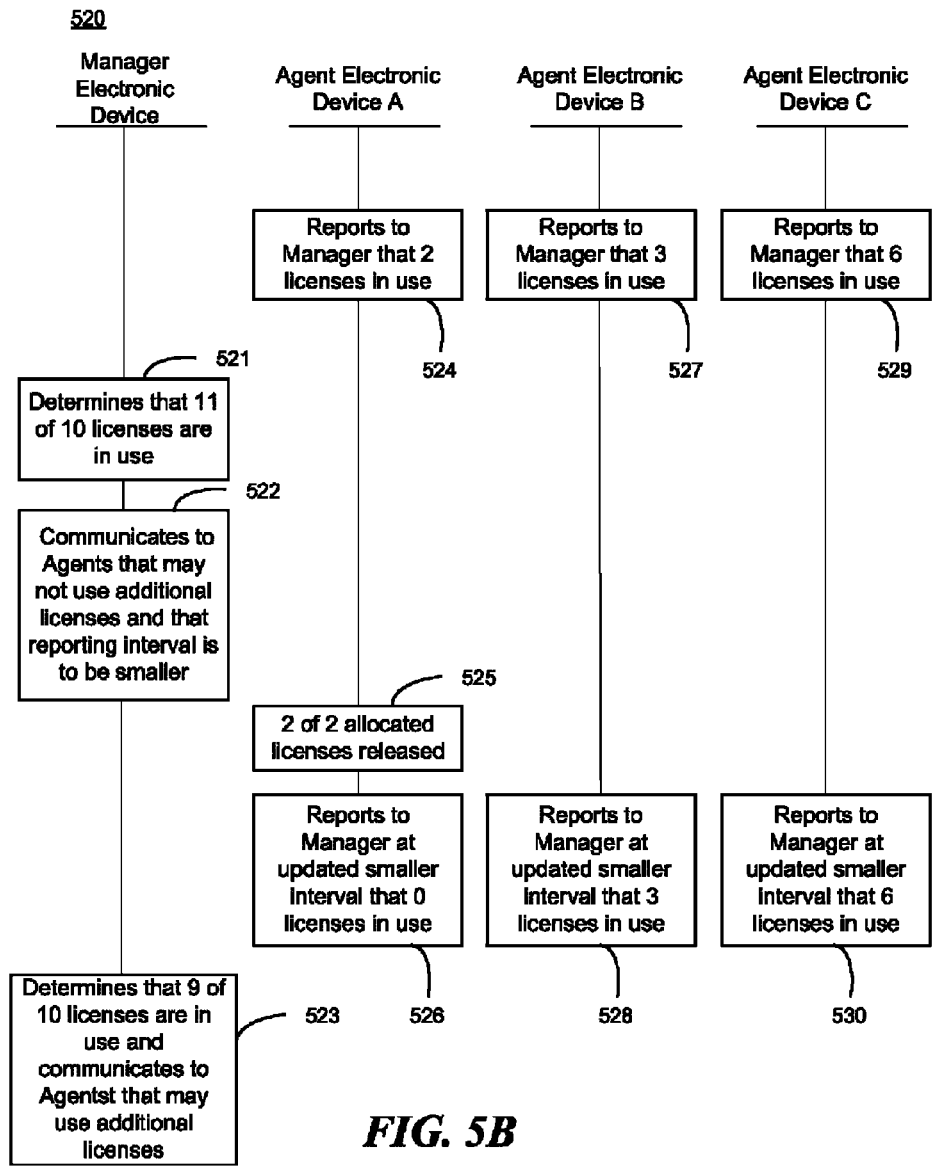
FIG. 5B is a diagram illustrating one example of a timeline of resource use communications between a manager electronic devices and agent electronic devices.

FIG. 5B is a diagram illustrating one example 520 of a timeline of resource use communications between a manager electronic device and agent electronic devices A, B, and C. The agent electronic devices A, B, and C may report to the manager electronic device information about the local use of the resource. For example, at 524, the agent electronic device A reports that it has two licenses in use, at 527, the agent electronic device B reports that it has three licenses in use, and at 529, the agent electronic device C reports that it has six licenses in use. The agent electronic devices A, B, and C may send the information at any suitable interval. The different agent electronic devices may send the information at the same intervals or at different intervals.

The manager electronic device may determine the remaining availability of licenses based on the reports. For example, at 521, the manager electronic device determines that eleven of ten available licenses are in use. In response, the manager electronic device may, for example, send an agent electronic device an instruction to revoke a license or may allow the amount of licenses in use to be above the threshold temporarily until a license in use is released. At 522, the manager electronic device sends an instruction to each of the agent electronic devices not to use any additional licenses and to decrease the reporting interval such that the manager electronic device receives reports more frequently. More frequent reporting when agent electronic devices are not allowed to allocate additional resources may allow the system to return back to allocation sooner than if the reporting interval were longer because the manager electronic device may more quickly become aware of lower license use numbers. For example, at 525, two of two allocated licenses on the agent electronic device A are released.

Each agent electronic device may report its resource allocation information at the smaller interval. At 526, the agent electronic device A reports that zero licenses are use, at 528, the agent electronic device B reports that three licenses are in use, and at 530, the agent electronic device C reports that six licenses are in use. The manager electronic device may evaluate the reported information to determine the remaining availability of licenses. At 523, the manager electronic device determines that nine of ten licenses are in use and instructs the agent electronic devices that they may allocate additional licenses. The manager electronic device may keep the smaller reporting interval, or may instruct the agent electronic devices to return to a larger reporting interval. The smaller reporting interval may be used, for example, while the number of outstanding licenses is close to the threshold to increase the likelihood that an amount above the threshold would be caught sooner, and, as a result, additional allocations over the threshold may be prevented sooner.

Figure 5C:
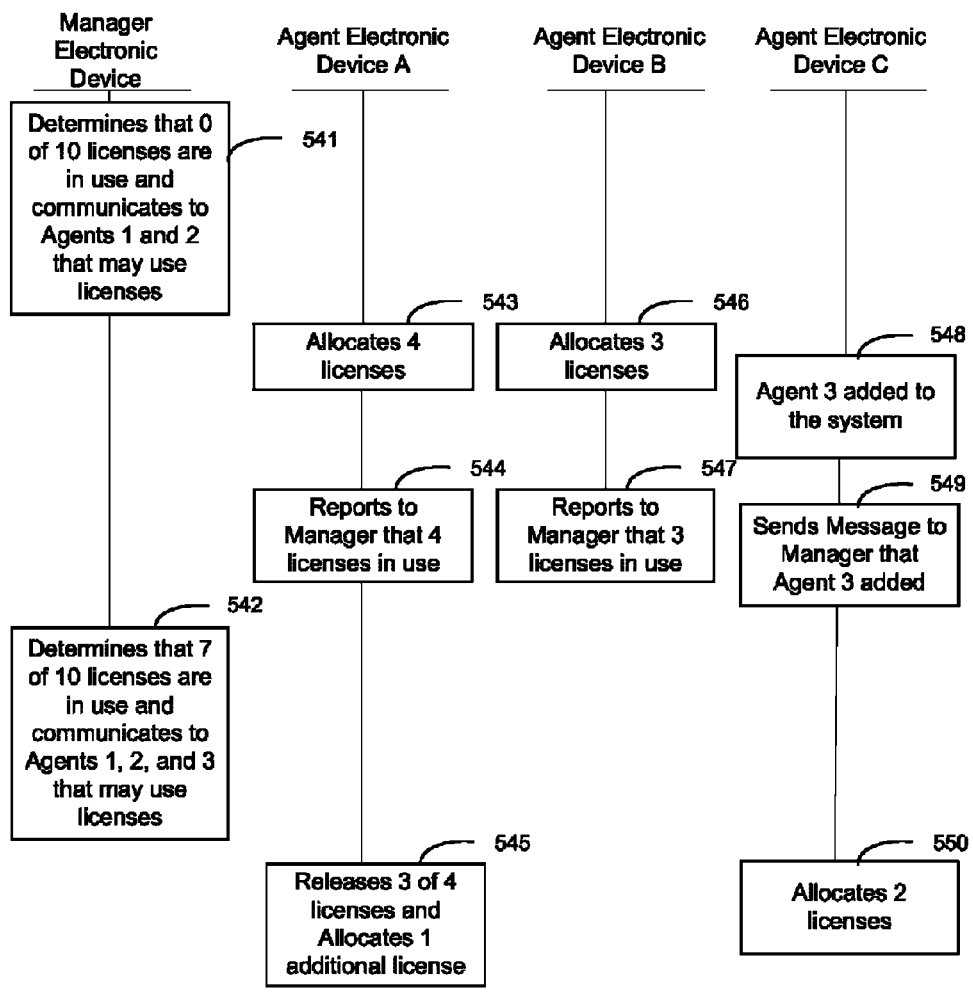
FIG. 5C is a diagram illustrating one example of a timeline of resource use communications between a manager electronic devices and agent electronic devices.

FIG. 5C is a diagram illustrating one example 540 of a timeline of resource use communications between a manager electronic devices and agent electronic devices A, B, and C where the agent electronic device C sends a message to the manager electronic device to configure an additional agent electronic device. In one embodiment, a system of communication may be configured by an agent electronic device communicating information about its existence to the manager electronic device. In some implementations, the manager electronic device may not track of the configuration of the computing system. The manager may learn of an agent electronic device from a resource report or other message from the agent electronic device.

Initially, the manager electronic device may be in communication with the agent electronic devices A and B. The manager electronic device may determine the number of available resources and send an instruction to the agent electronic devices A and B. For example, at 541, the manager electronic device determines that zero of ten licenses are in use and sends an instruction to the agent electronic devices A and B to indicate that the agent electronic devices A and B may use more licenses. In response to the instruction from the manager electronic device, the agent electronic devices A and B may allocate more licenses when requested. For example, at 543, the agent electronic device A allocates four licenses and at 546, the agent electronic device B allocates three licenses.

The agent electronic devices A and B may periodically communicate information about the amount of a resource in use to the manager electronic device so that the manager electronic device may determine the remaining availability of the resource. For example, at 544, the agent electronic device A reports to the manager electronic device that four licenses are in use. At 547, the agent electronic device B reports to the manager electronic device that three licenses are in use.

An agent electronic device may be added or removed from the computing system or may begin allocating the resource. At 548, the agent electronic device C is added. At 549, the agent electronic device C sends a message to the manager electronic device to indicate that the agent electronic device C will be allocating licenses. The manager electronic device may begin sending instructions to the agent electronic device C after receiving a configuration message or resource report from the agent electronic device C.

The manager electronic device may send instructions to each of the agent electronic devices in communication with the manager electronic device. For example, at 542, the manager electronic device may send instructions to continue to allocate licenses to agent electronic devices A, B, and C. In response, the agent electronic devices may continue to allocate licenses when requested. For example, at 545, three of four licenses on the agent electronic device A are released, and the agent electronic device A allocates an additional license such that two licenses are in use on the agent electronic device A. At 550, the newly added agent electronic device C allocates two licenses.

Figure 5D:
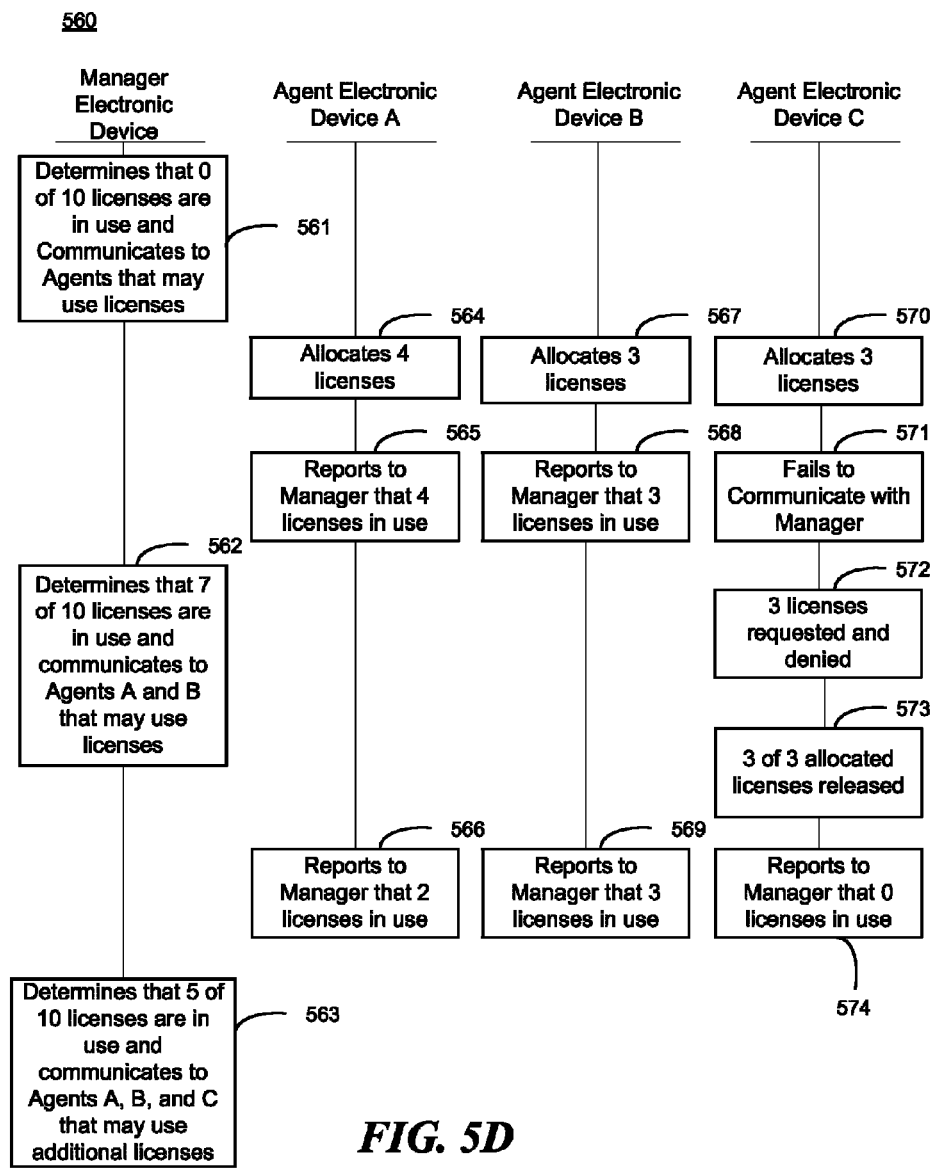
FIG. 5D is a diagram illustrating one example of a timeline of resource use communications between a manager electronic devices and agent electronic devices.

FIG. 5D is a diagram illustrating one example 560 of a timeline of resource use communications between a manager electronic devices and agent electronic devices A, B, and C where the agent electronic device C loses communication with the manager electronic device. In one implementation, an agent electronic device that is unable to communicate with the manager electronic device does not allocate additional resources. The manager electronic device may assume that any agent electronic device not sending it a resource report does not have allocated resources. The agent electronic device may release its already allocated resources over time and refuse requests to grant additional resources such that the agent electronic device will not have licenses in use once the allocated resources are released. In some cases, an agent electronic device that is unable to communicate with a manager electronic device may revoke licenses in use.

The manager electronic device may determine the amount of available licenses. At 561, the manager electronic device determines that zero of ten licenses are in use, leaving ten available licenses. Because there are remaining licenses available, the manager electronic device may send instructions to each of the agent electronic devices to allocate additional licenses when requested. At 564, the agent electronic device A allocates four licenses, at 567, the agent electronic device B allocates three licenses, and at 570, the agent electronic device C allocates three licenses.

The agent electronic devices A, B, and C may report to the manager electronic device the number of licenses in use. At 565, the agent electronic device A reports to the manager electronic device that four licenses are in use and at 568, the agent electronic device B reports to the manager electronic device that three licenses are in use. At 571, the agent electronic device C tries but fails to report its resource use to the manager electronic device.

In one implementation, if a communication connection with the manager electronic device is lost, such as where the agent electronic device is unable to report resource use information to the manager electronic device or where the agent electronic device does not receive resource use instructions from the manager electronic device, the agent electronic device refrains from allocating additional resources. This may be done, for example, to prevent a customer from disconnecting an agent electronic device from the manager electronic device so that the agent electronic device will continue to allocate unauthorized resources. The manager electronic device may determine the remaining availability of licenses based on the received reports from the agent electronic devices A and B. The manager electronic device may assume that an agent electronic device not reporting to the manager is not using the resource. The manager electronic device may also in some cases limit its instructions to agent electronic devices reporting to the manager in case agent electronic devices not communicating with the manager electronic device are agent electronic devices that are removed from the system or no longer using the resource.

At 562, the manager electronic device determines that seven of ten licenses are in use based on reports from the agent electronic device A and the agent electronic device B. The manager electronic device may be unaware of the three licenses used by the agent electronic device C. The manager electronic device may send instructions to the agent electronic device A and the agent electronic device B that additional licenses may be allocated because the threshold of ten licenses has not been reached based on the reports from the agent electronic devices A and B.

An agent electronic device unable to communicate with the manager electronic device may refuse requests for resource allocations. At 572, the agent electronic device C receives requests for three licenses and denies requests because it lost communication with the manager electronic device. At 573, the three licenses in use on the agent electronic device are released leaving no license in use on the agent electronic device C.

The agent electronic devices A, B, and C may periodically report information about their resource use. At 566, the agent electronic device A reports that two licenses are in use and at 569, the agent electronic device B reports that three license are in use. At 574, the agent electronic device C regains communication with the manager electronic device and reports that it has zero licenses in use. At 563, the manager electronic device determines that five of ten licenses are in use based on the reports from the agent electronic devices A, B, and C and instructs the agent electronic devices, including the agent electronic device C, that additional licenses may be allocated.

Figure 5E:
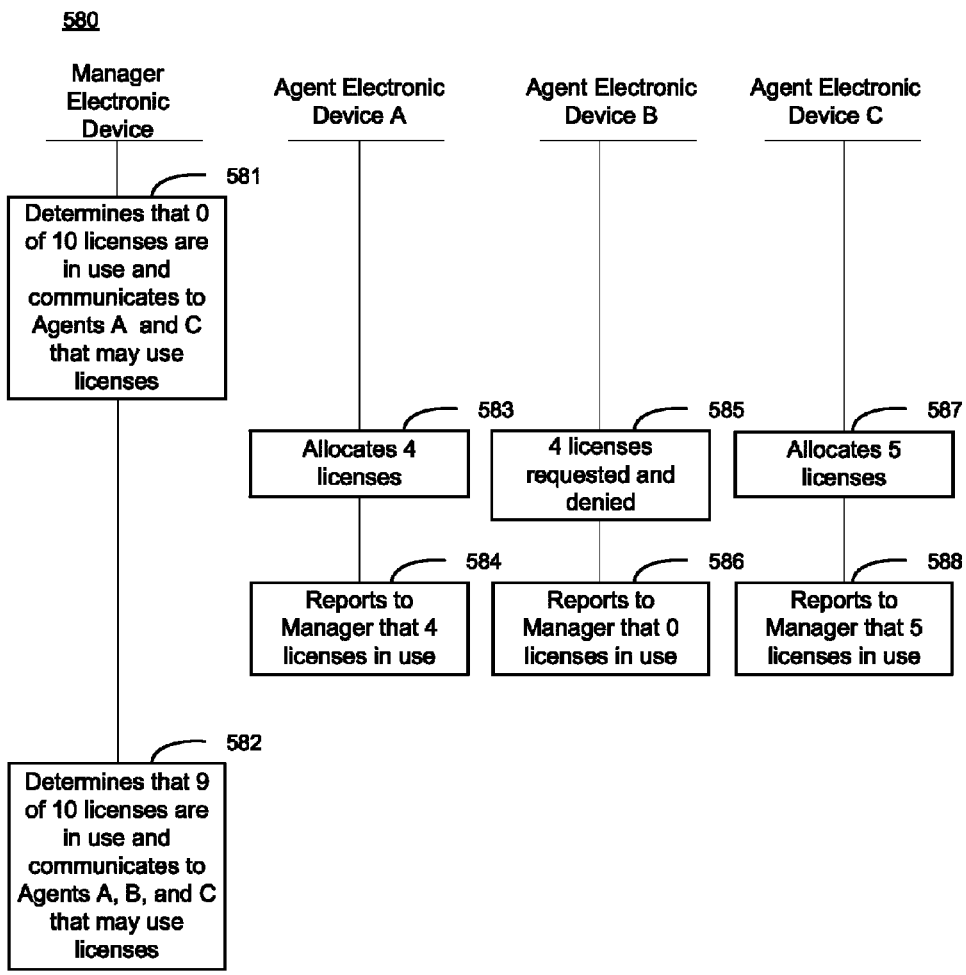
FIG. 5E is a diagram illustrating one example of a timeline of resource use communications between a manager electronic devices and agent electronic devices.

FIG. 5E is a diagram illustrating one example 580 of a timeline of resource use communications between a manager electronic devices and agent electronic devices A, B, and C. In some cases, the manger electronic device may lose communication with an agent electronic device such that is unable to send instructions to the agent electronic device. In response, the agent electronic device may deny requests for additional resources until the agent electronic device is able to successfully send a communication to the manager electronic device.

At 581, the manager electronic device determines that ten licenses are available and sends the information to the agent electronic device A and the agent electronic device C. The manager electronic device fails to send the instructions to the agent electronic device B. For example, there may be a loss of a network connection.

Agent electronic devices receiving the instructions may allocate licenses according to the instructions. For example, at 583, the agent electronic device A allocates four licenses and at 587, agent electronic device C allocates five licenses. At 585, the agent electronic device B denies requests for four licenses because the agent electronic device B did not receive a message from the manager electronic device at an expected interval.

The agent electronic devices may periodically report information about their license use to the manager electronic device. At 584, the agent electronic device A reports that four licenses are in use and at 588, the agent electronic device C reports that five licenses are in use. At 586, the agent electronic device B sends a report to the manager electronic device that it has zero licenses in use. In response, the manager electronic device begins communicating with the agent electronic device B again. At 582, the manager electronic device determines that one license remains available and communicates to the agent electronic devices A, B, and C that additional licenses may be used.

Managing shared resources using periodic communications of resource use instructions from a manager electronic device and resource use reports from agent electronic devices may result in fewer messages exchanged. In addition, such a system may be more easily configured and adapted to changes in the computing system.

The invention claimed is:

1. A computing system, comprising:
a manager electronic device comprising a processor to:
   determine availability of a shared computing resource among multiple agent electronic devices based on reports from the agent electronic devices indicating local use of the shared computing resource on the agent electronic devices;
   instruct the multiple agent electronic devices about an interval for reporting information about use of the resource to the manager electronic device; and
   instruct periodically the agent electronic devices about use of the resource based on the determined availability of the resource,
wherein the agent electronic devices comprise a processor to track use of the resource within the associated agent electronic device and allocate the resource for use within the associated agent electronic device based on instructions received from the manager electronic device, and
wherein determining the availability of the resource comprises:
   incrementing a number of outstanding resources based on the information reported from the agent electronic devices; and
   comparing the number of outstanding resources to a resource limit.

2. The computing system of claim 1, wherein the shared computing resource comprises a license.

3. The computing system of claim 1, wherein the instructions comprise at least one of:
   whether more of a resource may be used, the type of a resource that may be used, whether to suspend use of an allocated resource, and a warning that the availability of a resource is below a threshold.

4. A method for managing a shared computing resource, comprising:
   reporting, by agent electronic devices in a computing system, information to a manager electronic device indicating use of the shared computing resource associated with the agent electronic devices;
   instructing, by the manager electronic device, the agent electronic devices about an interval for reporting information about use of the resource to the manager electronic device;
   instructing, by the manager electronic device, the agent electronic devices to track use of the resource within the associated agent electronic devices;
   determining, by the manager electronic device, a remaining availability of the resource based on the information received from the agent electronic devices;
   instructing, by the manager electronic device, the agent electronic devices to allocate the resource for use within the associated agent electronic devices based on the determined remaining availability; and
   using, by the agent electronic devices, the resource based on the instructions received from the manager electronic device,
   wherein determining the remaining availability comprises:
      incrementing a number of outstanding resources based on the information reported from the agent electronic devices; and
      comparing the number of outstanding resources to a resource limit.

5. The method of claim 4, further comprising:
   monitoring, by the agent electronic devices, whether a communication connection to the manager electronic device is available; and
   refraining, by the agent electronic devices, from using an additional amount of the resource where the communication connection to the manager electronic device is unavailable.

6. The method of claim 4, wherein using the resource based on the instructions comprises:
   allocating an additional amount of the resource where the instructions indicate that an additional amount of the resource may be used; and
   refraining from allocating an additional amount of the resource where the instructions indicate that an additional amount of the resource may not be used.

7. The method of claim 4, wherein the information reported by the agent electronic devices comprises at least one of: the amount of a resource in use and the amount of a particular type of resource in use.

8. The method of claim 4, further comprising sending, by one of the agent electronic devices, a message to the manager electronic device indicating that the agent electronic device is joining the computing system.

9. A machine-readable non-transitory storage medium including instructions executable by a processor, comprising instructions to:
- determine availability of a shared computing resource based on reports received from multiple agent electronic devices indicating use of the resource associated with the agent electronic devices;
- instruct the multiple agent electronic devices about an interval for reporting information about use of the resource to a manager electronic device; and
- instruct the multiple agent electronic devices to track use of the resource within the associated agent electronic devices;
- send commands related to use of the resource to the agent electronic devices based on the determined availability of the resource, wherein the commands a command to at least one agent electronic device includes instructions to allocate the resource for use within the at least one agent electronic device,
- wherein determining the availability of the resource comprises:
  - incrementing a number of outstanding resources based on the information reported from the agent electronic devices; and
  - comparing the number of outstanding resources to a resource limit.

10. The machine-readable non-transitory storage medium of claim 9, wherein the report received from the agent electronic devices comprises a report of the amount of the resource in use on the agent electronic devices.

11. The machine-readable non-transitory storage medium of claim 9, wherein the commands comprise at least one of: whether more of a resource may be used, the type of a resource that may be used, whether to suspend use of an allocated resource, and a warning that the availability of a resource is below a threshold.

12. The machine-readable non-transitory storage medium of claim 9, further comprising instructions to send commands to the agent electronic devices related to the manner for reporting resource use information.

13. The machine-readable non-transitory storage medium of claim 9, determining the availability of the resource comprises comparing the aggregate amount of the resource in use by the agent electronic devices to a limit on the amount of the resource.

* * * * *